United States Patent [19]
Yamahira

[11] Patent Number: 5,709,969
[45] Date of Patent: Jan. 20, 1998

[54] NON-AQUEOUS ELECTROLYTE SECONDARY CELL

[75] Inventor: Takayuki Yamahira, Fukushima, Japan

[73] Assignee: Sony Corporation, Tokyo, Japan

[21] Appl. No.: 911,851

[22] Filed: Aug. 15, 1997

Related U.S. Application Data

[63] Continuation of Ser. No. 548,520, Oct. 26, 1995, abandoned.

[30] Foreign Application Priority Data

Oct. 26, 1994 [JP] Japan ................. 6-262243
Jun. 9, 1995 [JP] Japan ................. 7-143377

[51] Int. Cl.$^6$ .......................... H01M 4/48; H01M 4/62
[52] U.S. Cl. .......................... 429/218; 29/623.1
[58] Field of Search .......................... 429/218; 29/623.1

[56] References Cited

U.S. PATENT DOCUMENTS

| | | | |
|---|---|---|---|
| 4,567,031 | 1/1986 | Riley | 423/593 |
| 4,818,647 | 4/1989 | Plichta et al. | 429/218 |
| 4,828,834 | 5/1989 | Nagura et al. | 429/194 |
| 4,983,476 | 1/1991 | Slane et al. | 429/197 |
| 5,110,696 | 5/1992 | Shokoohi et al. | 429/218 |
| 5,168,019 | 12/1992 | Sugeno | 429/218 |
| 5,196,279 | 3/1993 | Tarascon | 429/218 |
| 5,246,796 | 9/1993 | Nagamine et al. | 429/194 |
| 5,264,201 | 11/1993 | Dahn et al. | 429/218 |
| 5,316,875 | 5/1994 | Murai et al. | 429/194 |
| 5,340,670 | 8/1994 | Takami et al. | 429/194 |
| 5,385,794 | 1/1995 | Yokoyama et al. | 429/194 |

FOREIGN PATENT DOCUMENTS

A-0 556 555  8/1993  European Pat. Off. .

OTHER PUBLICATIONS

Sax et al., "Hawley's Condensed Chemical Dictionary, 11th edition", Van Nostrand Reinhold, p. 1045 (no month), 1987.

*Primary Examiner*—Prince Willis, Jr.
*Assistant Examiner*—Carol Chaney
*Attorney, Agent, or Firm*—Hill, Steadman & Simpson

[57] ABSTRACT

A non-aqueous electrolyte secondary cell including a negative electrode mainly composed of a carbonaceous material, lithium metal or a lithium alloy, a positive electrode mainly composed of a sintered mass of a lithium compound oxide and a non-aqueous electrolyte.

6 Claims, 1 Drawing Sheet

NON-AQUEOUS ELECTROLYTE SECONDARY CELL

This is a continuation of application Ser. No. 08/548,520 filed Oct. 26, 1995, and abandoned Aug. 15, 1997.

BACKGROUND OF THE INVENTION

This invention relates to a non-aqueous electrolyte secondary cell and, more particularly, to such cell having an improved positive electrode.

Recently, with promulgation of the portable equipments, such as video cameras or radio cassettes, there is an increasing demand for an iteratively usable secondary cell to replace a disposable primary cell.

A majority of currently employed secondary cells are nickel-cadmium cells employing an alkali liquid electrolyte. These cells have a voltage of approximately 1.2 V and it is difficult to improve the energy density. In addition, the self-discharge rate of the cell is as high as 20% or higher at ambient temperature.

Current research is being conducted towards concerning a non-aqueous electrolyte secondary cell employing a non-aqueous solvent as an electrolytic solution and a light metal such as lithium for the negative electrode. This non-aqueous electrolyte secondary cell has advantages in that it has a voltage as high as 3V or higher, so that a high energy density may be achieved, and the self-discharge rate of the cell is low.

However, if these secondary cells are repeatedly charged and discharged, metal lithium used for the negative electrode undergoes dendritic crystal growth and comes into contact with the positive terminal. In such case, the risk is high that shorting within the cell will occur. Consequently, the cell has an undesirably short duration and therefore is difficult to put into practical utilization.

For this reason, additional research is directed at a non-aqueous electrolyte secondary cell in which lithium is alloyed with other metals to be used as a negative electrode. However, this non-aqueous electrode secondary cell has a similarly short duration and is difficult to put to practical application, because the alloy of the negative electrode is turned into extremely fine particles as a result of repeated charging and discharging.

A non-aqueous electrolyte secondary cell employing a carbonaceous material, such as coke, as the active material for the negative electrode has also been proposed. This secondary cell exploits doping/undoping of lithium with respect to a space between the carbon layers for the cell reaction. These cells do not suffer from dendritic crystal growth on the negative electrode or to comminution of the negative electrode as described above, such that these cells are superior in cyclic durability characteristics. In particular, if a lithium compound oxide represented by the formula $LixMO2$, where M denotes one or more transition metals and $x$ is such that $0.05 < x < 1.10$, is employed as an active material for the positive electrode, the cell durability is improved, such that it becomes possible to fabricate a non-aqueous electrolyte secondary cell of the desired high energy density.

If a disc-shaped electrode employed in e.g., a coin-shaped cell, using such lithium compound oxide as an active material, powders of the lithium compound oxide is kneaded with a binder, an electrically conductive material and a dispersant and molded under compression to a disc shape. The binder usually accounts for 3 to 10% of the electrode in its entirety.

The non-aqueous electrolyte secondary cell, employing the carbonaceous material and the lithium compound oxide as the active materials for the negative and positive electrodes, respectively, has an energy density higher than that achieved with the nickel/cadmium cell. However, it cannot be said to be entirely satisfactory in view of its usage and application and thus it is desired to improve the charging/discharging efficiency and the energy density further. Although attempts are being made towards improving the packing density of the electrodes, a significant increase in the energy density has not yet been achieved.

OBJECT AND SUMMARY OF THE INVENTION

It is therefor an object of the present invention to provide a non-aqueous electrolyte secondary cell which is superior in the charging/discharging efficiency and which achieves a high energy density.

For accomplishing the above object, the present inventors have conducted eager searches, and have found that, by constituting the positive electrode by a sintered mass of a lithium compound oxide, the electrical conductivity, charging characteristics of the active material and the reaction area at the positive electrode may be increased, thus improving the charging/discharging efficiency and the energy density of the cell.

The present invention, brought to completion based upon the above finding, resides in a non-aqueous electrolyte secondary cell including a negative electrode mainly composed of a carbonaceous material, lithium, metal or a lithium alloy, a positive electrode mainly composed of a sintered mass of a lithium compound oxide and a non-aqueous electrolyte.

With the non-aqueous electrolyte secondary cell, employing lithium metal or alloy as an active material for the negative electrode, a lithium compound oxide is employed as an active material for the positive electrode. According to the present invention, the positive electrode of the cell, above all, is constituted by a sintered mass of the lithium compound oxide.

The method for forming a sintered mass of the lithium compound oxide is as follows:

First, powders of lithium salts and metal salts, as starting materials, are mixed in agreement with the elementary composition of the targeted lithium compound oxide, and the resulting mixture is molded under compression to an electrode shape. The molded product is baked at a pre-set temperature under an oxygen-containing atmosphere.

Alternatively, powders of the pre-synthesized lithium compound oxide are admixed with a minor quantity of the binder and the resulting mixture is molded under pressure to an electrode shape. The resulting molded product is baked in air, more preferably under an inert gas stream, at a pre-set temperature. The binder thus added in a minor quantity is carbonized during the baking process.

The sintered product of the lithium compound oxide may be produced by any known method.

Since the lithium compound oxide itself is improved in electrical conductivity by sintering, the sintered product of the lithium compound oxide is superior in electrical conductivity even although no electrically conductive agent is contained therein. The result is that the sintered product undergoes little polarization and the cell employing the sintered product is lowered in internal resistance. In addition, since no electrically conductive agent nor the binder is contained in the sintered product of the lithium compound oxide, the packing density of the active material and the reaction area of the positive electrode may be correspondingly increased, thus significantly contributing to the improved charging/discharging efficiency and to the improved energy density of the cell.

The sintered product of the lithium compound oxide is produced with the use of powders of the starting material of the lithium compound oxide or powders or the pre-synthesized lithium compound oxide as the sintering materials. As the powders of the lithium compound oxides for sintering, that is the starting material for the lithium compound oxide, the following powders are employed.

The ultimately produced sintered product of the lithium compound oxide is a lithium transition metal compound oxide represented by $LiMn_2O_4$ or by a lithium transition metal compound oxide represented by the formula $Li_xMO_2$, wherein M denotes one or more transition metals, preferably at least one of Co, Ni or Fe, and x is such that $0.05 \leq x \leq 1.10$. Specifically, the sintered product may be exemplified by $LiCoO_2$, $LiNiO_2$ and $LiNi_yCo_{1-y}O_2$, where $0<y<1$, or $LiMn_2O_4$.

Thus, if powders of the lithium compound oxide are used as a starting material, powders of the oxide having the same composition as that of the lithium compound oxide to be ultimately produced are employed. Powders of the sole lithium compound oxide may be used alone or in combination with the powders of other lithium compound oxides.

The powders of the lithium compound oxides may be produced by mixing carbonates of e.g., lithium, cobalt or nickel in pre-set mixing ratio, in agreement with the elementary composition of the lithium compound oxide. The resulting mixture is baked in an oxygen-containing atmosphere at a temperature of from 350° to 1000° C. and pulverized to powders of the lithium compound oxides. The starting materials may be hydroxides or oxides without being limited to the carbonates.

Although no limitations are imposed on the binder admixed to powders of the lithium compound oxide, it is preferred to employ polyvinyl alcohol (PVA), polyethylene, polypropylene, phenolic resins, furan resins, divinylbenzene, polyvinylidene fluoride, polyvinylidene chloride, Teflon, pitch, binder pitch and mesophase pitch.

On the other hand, if powders of the lithium compound oxide are used as the starting material, carbonates, hydroxides, oxides, alkoxides or organic acid salts of lithium, cobalt or nickel are used in a pre-set mixing ratio in agreement with the elementary composition of the ultimate lithium compound oxide.

The above starting powders of the lithium compound oxide or the powders of the lithium compound oxide are molded under compression and baked to a sintered mass of the lithium compound oxide for the positive electrode. The technique of the compression molding and baking is basically the same no matter which material is used as the material for sintering.

The pressure used at the time of compression molding is reflected by the volumetric density of the ultimate sintered mass. If the characteristics of the positive electrode are taken into account, the volumetric density of the sintered mass is preferably 2.0 to 4.3 g/ml. If the volumetric density is lower than this range, the energy density cannot be improved sufficiently. Conversely, if the volumetric density of the sintered mass surpasses this range, the electrolyte solution is lowered in impregnating characteristics and in the charging/discharging characteristics. Thus it is preferred to set the pressure for compression molding so that the volumetric density of the sintered mass will be in a range of from 2.0 to 4.3 g/ml and desirably in a range of from 2.5 to 4.0 g/ml.

The compression molded mass is preferably baked in a temperature range of from 350° to 1000° C. If the sintering temperature is lower than this range, the reaction of synthesis or sintering becomes incomplete such that the desired sintered mass cannot be produced. If the powders of the lithium compound oxide are used as the material for sintering, the baking temperature is preferably not lower than 500° C. so that the binder added in a minor quantity during the step of compression molding will be carbonized completely during the baking process.

The baking atmosphere is an oxygen-containing atmosphere if the powders of the starting materials for the lithium compound oxide are used as the starting material and air, preferably an atmosphere of an inert gas stream if the powders of the lithium compound oxide are used as the starting material.

The sintered mass thus produced may be directly employed as the positive electrode. However, the sintered mass of the lithium compound oxide compounded with a current collector may also be employed. The positive electrode may be improved further by compounding the current collector to the sintered mass of the lithium compound oxide.

The positive electrode consisting in the sintered mass compounded with the current collector may be produced by press bonding the current collector to a lateral surface of the molded product at the stage of molding the powders of the lithium compound oxide or starting powders for the lithium compound oxide under compression and by baking the resulting assembly. In this case, it is preferred to employ fine powders of lithium compound oxides with a mean particle size on the order of 10 μm.

For compounding the sintered body and the current collector in this manner, the melting temperature of the current collector needs to be taken into account in setting the baking temperature for avoiding thermal deformation of the current collector. The current collector for the positive electrode is usually formed of aluminum (melting point, 660° C.). If the aluminum current collector is used, the baking temperature is set to 350° to 700° C. and preferably to 500° to 660° C. If the baking temperature is set to higher than 660° C., the baking time is preferably set to a shorter time duration on the order of three hours. In such case, preferred starting powders for the lithium compound oxide are those undergoing a synthesis reaction at lower temperatures, such as alkoxides or organic acid salts.

While the positive electrode is constituted with the present invention by a sintered mass of the lithium compound oxide, the negative electrode and the electrolyte commonly used with this type of the cell may be employed.

As the active material for the negative electrode, lithium metal, a lithium alloy or a carbonaceous material capable of doping/undoping lithium is employed.

If the active material is lithium metal or a lithium alloy, a corresponding metal or alloy plate, punched to a desired electrode shape, is employed as the negative electrode.

If the active material is a carbonaceous material, powders of the carbonaceous material are kneaded with a binder or a dispersant and dried and the resulting mixture is molded under compression to the shape of a desired electrode used as a negative electrode.

Examples of the carbonaceous materials include graphites, pyrocarbons, cokes, such as pitch coke, needle coke or petroleum coke, carbon black, such as acetylene black, vitreous carbons, a baked mass of organic high molecular materials, carbon fibers and activated charcoal. The baked mass of the organic high molecular materials is obtained on baking the organic high molecular material in an inert gas stream or in vacuum at a suitable temperature exceeding 500° C.

Alternatively, sintered carbonaceous materials may be employed as the negative electrode.

Of the sintered materials, petroleum pitch, binder pitch, high molecular resin or green cokes are preferred. Still alternatively, mixtures of completely carbonized graphites, pyrocarbons, cokes such as pitch coke, needle coke or petroleum coke, carbon black, such as acetylene black, vitreous carbons, baked mass of the above-mentioned organic high molecular materials or carbon fibers with the pitch containing the above resins, highly sinterable resins, such as furan resins, divinylbenzene, polyvinylidene fluoride or polyvinylidene chloride, may be employed.

An electrolyte solution obtained on dissolving salts of electrolytes in an organic solvent may be employed as the electrolyte solution.

Examples of the organic solvents include esters such as propylene carbonate, ethylene carbonate or γ-butyrolactone, ethers such as diethylether, tetrahydrofuran, substituted tetrahydrofuran, dioxolane, pyran, derivatives thereof, dimethoxyethane or diethoxyethane, 3-substituted-2-oxazolidinones, such as 3-methyl-2-oxazolidinone, sulforane, methyl sulforane, acetonitrile and propionitrile. These may be used alone or in combination.

As the electrolyte salts, lithium perhydrochlorate, lithium borofluoride, lithium phosphofluoride, lithium aluminate chloride, lithium halogenides or lithium trifluoromethane sulfonate, may be employed.

Solid electrolytes may also be employed as the electrolyte solution.

While the non-aqueous electrolyte secondary cell may be constituted by the above constituents, the shape of the cell in which these constituents are assembled may suitably be of a laminated square shape or a card shape, besides the coin or button shape.

DESCRIPTION OF THE PREFERRED EMBODIMENT

Figure 1:
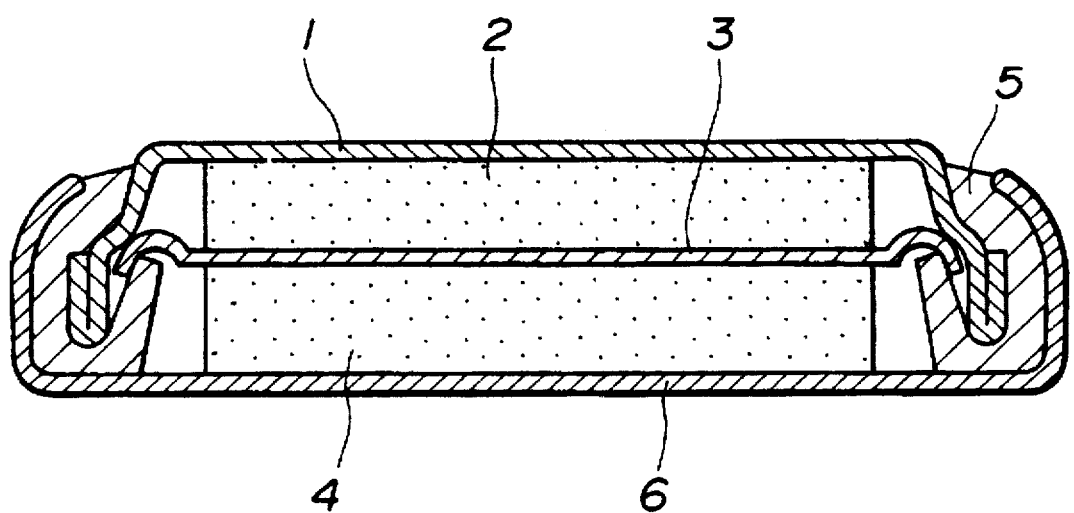
FIG.1 (sole FIGURE) is a transverse cross-sectional view showing an arrangement of the non-aqueous electrolyte secondary cell embodying the present invention.

An illustrative embodiment of the present invention is explained with reference to an experimental example.

EXAMPLE 1

FIG. 1 shows a coin-shaped cell prepared in the present Example. This coin-shaped cell is comprised of a disc-shaped negative electrode 2, accommodated in a negative electrode cup 1, and a disc-shaped positive electrode 4, accommodated in a positive electrode cup 8 and stacked on the negative electrode 2 with a separator 3 in-between. The negative electrode cup 1 and the positive electrode cup 8 are caulked with a gasket 5 for crimp sealing. In the present embodiment, the above-described coin-shaped cell was fabricated in the following manner.

First, the positive electrode 4 was prepared by the following sequence of operations:

0.5 mol of lithium carbonate powders and 1 mol of cobalt carbonate powders were mixed together and compression-molded under a pressure of 3 tons to a pellet 16.0 mm in diameter. This pellet was baked in air for three hours at a temperature of 900° C. to a LiCoO2 sintered product 15.5 mm in diameter, which is to be the positive electrode 4. The LiCoO2 sintered product had a volumetric density $\underline{d}$ of 3.0 g/ml.

The negative electrode 4 was then prepared by the following sequence of operations:

The active material for the negative electrode was produced by crushing the pitch coke for 15 minutes in a vibration mill with stainless steel balls 12.7 mm in diameter. The pitch coke had a true density of 2.03 g/cm³, the spacing of the 002 plane as found by the X-ray diffraction method in accordance with the Law for Japan Society for Promotion of Science of 3.46 Å and the crystal thickness Lc in the C-axis direction of 40 Å. The mean particle size of the powders obtained in crushing is 33 μm.

90 parts by weight of the particulate pitch coke were mixed with 10 parts by weight of polyvinylidene fluoride as a binder. To the resulting mixture was added N-methyl pyrrolidone as a dispersant to produce a negative electrode paste. This negative electrode paste was dried and molded to a diameter of 16 mm to produce a pellet-shaped negative electrode 2.

The positive electrode 4, negative electrode 2, positive electrode cup 6, negative electrode cup 1 and the separator 3 were stacked in the order of the negative electrode cup 1, negative electrode cup 2, separator 3, positive electrode 4 and the positive electrode cup 6. An electrolyte solution obtained on dissolving LiPF6 in a mixed solution of ethylene carbonate and diethyl carbonate at a concentration of 1 mol/l was injected into the inside of the stack.

The negative electrode cup 1 and the positive electrode cup 6 were caulked with the gasket 5 to produce a coin-shaped cell, 20 mm in diameter and 2.5 mm in thickness, having the same shape as the CR2025 cell.

EXAMPLE 2

A coin-shaped cell was produced in the same way as in Example 1 except setting the compression pressure for pelletizing lithium carbonate powders and cobalt carbonate powders to 4 tons in fabricating a sintered mass of LiCoO2 which is to be the positive electrode 4. The volumetric density $\underline{d}$ of the sintered mass of LiCoO2 was 3.5 g/ml.

EXAMPLE 3

A coin-shaped cell was produced in the same way as in Example 1 except employing the LiCoO2 sintered mass, fabricated as described above, as the positive electrode 4.

That is, 0.5 mol of lithium carbonate and 1 mol of cobalt carbonate were mixed together and the resulting mixture was baked in air at a temperature of 900° C. for five hours to LiCoO2 which was then ball-milled to powders with a mean particle size of 10 μm.

The LiCoO2 powders, thus obtained, and polyethylene powders, were mixed at a weight ratio of 90:10 and compression molded under a pressure of 2 tons to a pellet 16.0 mm in diameter. This pellet was baked in air at a temperature of 900° C. for three hours to a LiCoO2 sintered mass, 15.5 mm in diameter, which is to be the positive electrode 4. The volumetric density $\underline{d}$ of the sintered mass of LiCoO2 was 3.1 g/ml.

EXAMPLE 4

A coin-shaped cell was produced in the same way as in Example 3 except employing the pressure for pelletizing the LiCoO2 powders and polyethylene powders to 3 tons for producing the LiCoO2 sintered mass as the positive electrode 4.

Comparative Example 1

A coin-shaped cell was produced in the same way as in Example 1 except employing the LiCoO2 pellet, fabricated as described below, as the positive electrode 4.

That is, 0.5 mol of lithium carbonate and 1 mol of cobalt carbonate were mixed together and the resulting mixture was baked in air at a temperature of 900° C. for five hours to LiCoO2 which was then ball-milled to powders with a mean particle size of 10 μm.

91 parts by weight of LiCoO2 powders, 6 parts by weight of graphite, as an electrically conductive agent, and 3 parts by weight of polyvinylidene fluoride, as a binder, were mixed together. To the resulting mixture was added N-methyl pyrrolidone, as a dispersant, to prepare a positive electrode paste. This positive electrode paste was dried and compression molded under a pressure of 5 tons to produce a pellet-shaped positive electrode 4 which was 15.5 mm in diameter. The volumetric density $\underline{d}$ of the positive electrode was 3.5 g/ml. The internal resistance, charging capacity and the discharging capacity were measured of the cell thus produced for finding the charging/discharging efficiency.

The charging and discharging were carried out by a process consisting in effecting constant-current charging under conditions of a charging current of 1 mA and a terminal voltage of 4.2 V, followed by constant-current discharging under conditions of a discharging current of 3 mA and a terminal voltage of 3.0 V. The results of measurement are shown in Table 1.

TABLE 1

|  | binder (%) | positive electrode density (g/ml) | internal cell resistance (Ω) | charging capacity (mAh) | discharging capacity (mAh) | charging/discharging efficiency (%) |
|---|---|---|---|---|---|---|
| Ex. 1 | 0 | 3.0 | 11 | 49 | 45.8 | 93 |
| Ex. 2 | 0 | 3.5 | 12 | 57 | 53.0 | 93 |
| Ex. 3 | 0 | 3.1 | 12 | 51 | 46.9 | 92 |
| Ex. 4 | 0 | 3.5 | 13 | 58 | 53.9 | 93 |
| Comp. Ex. 1 | 5 | 3.5 | 20 | 57 | 28.5 | 50 |

It is seen from Table 1 that the cells of Examples 1 to 4, employing the LiCoO2 sintered mass as the positive electrode, is lower in internal resistance and higher in the charging/discharging capacity than the cell of Comparative Example 1 employing the pellet composed of LiCoO2, electrically conductive agent and the binder, as the positive electrode.

Thus it is seen that the LiCoO2 sintered mass is more favorable as the positive electrode than the pellet composed of LiCoO2, electrically conductive agent and the binder.

It is noted that powders of the starting material for LiCoO2 are used as the sintering material in Examples 1 and 2, whereas powders of synthesized LiCoO2 are used as the sintering material in Examples 3 and 4. In these Examples, comparable characteristics are achieved. Thus it is seen that the sintered mass produced by any method may be employed as the positive electrode if the ultimate electrode density is proper.

Investigations into Volumetric Density of Sintered Mass of Lithium Compound Oxide Investigations were conducted into an optimum volumetric density of the sintered mass of the lithium compound oxide.

A number of coin-shaped cells (Experimental Examples 1 to 7) were produced in the same way as in Example 1 except using varying values of the pressure employed for pelletizing powders of lithium carbonate and cobalt carbonate in fabricating a LiCoO2 sintered mass as the positive electrode 4.

The internal resistance was then measured of the fabricated cell. Charging/discharging was then carried out in the same way as above for measuring the charging capacity, discharging capacity and the charging/discharging efficiency. The measured results are shown in Table 2 along with the pressure used for producing the LiCoO2 sintered product and the volumetric density of the positive electrode.

TABLE 2

|  | binder (%) | pressure (t) | positive electrode density (g/ml) | internal resistance of cell (Ω) | charging capacity (mAh) | discharging capacity (mAh) | charging/discharging efficiency (%) |
|---|---|---|---|---|---|---|---|
| Exp. ex. 1 | 0 | 1 | 2.0 | 10 | 33 | 31.4 | 95 |
| Exp. ex. 2 | 0 | 2 | 2.5 | 11 | 41 | 38.0 | 93 |
| Exp. ex. 3 | 0 | 3 | 3.0 | 11 | 49 | 45.8 | 93 |
| Exp. ex. 4 | 0 | 4 | 3.5 | 12 | 57 | 53.0 | 93 |
| Exp. ex. 5 | 0 | 5 | 4.0 | 14 | 65 | 58.5 | 90 |
| Exp. ex. 6 | 0 | 7 | 4.3 | 15 | 70 | 53.0 | 75 |
| Exp. ex. 7 | 0 | 10 | 4.5 | 25 | 73 | 21.9 | 30 |

It is seen from Table 2 that, with a cell having the volumetric density of the LiCoO2 sintered mass of 2.0 to 4.3 g/ml, the internal resistance of the cell is lower, while a high charging/discharging efficiency is achieved. However, as for the charging capacity, it becomes the lower the smaller the volumetric density of the LiCoO2 sintered mass. Thus it may be estimated that, if the volumetric capacity of the LiCoO2 sintered mass is lower than 2.0 g/ml, the charging capacity becomes lower. With a cell of the Experimental Example 7 with the volumetric density of the LiCoO2 sintered mass of 4.5 g/ml, the internal resistance of the cell becomes higher and the charging/discharging efficiency becomes lower. It may be contemplated that the reason the internal resistance of the cell becomes the higher the higher the volumetric density of the LiCoO2 sintered mass resides in the lowered impregnation characteristics of the electrolyte solution into the sintered mass.

Thus it is seen that the proper volumetric density of the sintered product of the lithium compound oxide is preferably 2.0 to 4.3 g/ml and more preferably 2.5 to 4.0 g/ml.

Investigations into Effect of Using the Current Collector

The effect of having the current collector held by the sintered product was analyzed.

A number of coin-shaped cells (Experimental Examples 8 to 18) were produced in the same way as in Example 1 except using a compounded product of the current collector and the LiCoO2 sintered mass produced as described above.

That is, 0.5 mol of lithium carbonate and 1 mol of cobalt carbonate were mixed together and the resulting mixture was baked in air at a temperature of 900° C. for five hours to LiCoO2 which was then ball-milled to powders with a mean particle size of 10 μm.

99 wt % of LiCoO2 thus produced and 1 wt % of a polyvinyl alcohol (PVA) resin with a molecular weight of 6000 were mixed together and compression-molded under a pressure of 5 ton to a pellet 15.5 mm in diameter. An expanded metal of aluminum, as a current collector, was press-fitted to the bottom of the pellet and the resulting assembly was baked in a nitrogen gas stream at a temperature and for a time duration shown in Table 3 for producing a compounded product of the LiCoO2 sintered product and the current collector.

The internal resistance was then measured of the fabricated cell. Charging/discharging was then carried out in the same way as above for measuring the charging capacity, discharging capacity and the charging/discharging efficiency. The measured results are shown in Table 3, along with the sintering temperature and time of the LiCoO2 sintered product as well as the outside diameter and the volumetric density of the positive electrode. The volumetric density is that of the sintered product itself not including the current collector.

By way of comparison, similar measurements were conducted of a coin-shaped cell employing the LiCoO2 pellet produced in the same way as in the Comparative Example 1 and holding the current collector as a positive electrode (Experimental Example 1) and a coin-shaped cell employing a LiCoO2 sintered product fabricated in the same way as in Experimental Example 2 except not having a current collector held by the sintered product, as a positive electrode (Experimental Example 18). The results are also shown in Table 3.

baking temperature was so low that sintering could not be achieved. On the other hand, with the Experimental Example 8, with the baking temperature of 750° C. the baking temperature as so high that the current collector was melted and lost its mesh shape and hence could not be assembled into the cell.

Conversely, with the cells of the Experimental Examples 9 to 15, with the baking temperatures of 350° to 700° C., changes in density and volume indicated fulfillment of the sintering of LiCoO2. On the other hand, the internal resistance was low while the charging/discharging efficiency indicated higher values.

It is seen from this that, for fabricating a compound product of the sintered lithium compound oxide and the current collector, the baking temperature of 350° to 700° C. and preferably of 500° to 660° C. is desirable.

Comparison of the cells of the Experimental Examples 9 to 15 to the cell of the Experimental Example 17 in which the current collector is held by a pellet composed of the electrically conductive agent and the binder so as to be used as a positive electrode reveals that the cells of the Experimental Examples 9 to 15 are lower in internal resistance and higher in charging/discharging efficiency than the cell of the Experimental Example 17.

Thus it is seen that the LiCoO2 sintered product is more preferred as the positive electrode than a pellet composed of LiCoO2, the electrically conductive agent and the binder. These results are in agreement with the results of the Previous Examples 1 to 4 and the Comparative Example 1.

Comparison of the cells of the Experimental Examples 9 to 15 to the cell of Experimental Example 18 employing a LiCoO2 sintered product not carrying the current collector reveals that the cells of the Experimental Examples 9 to 15 are lower in internal resistance and higher in charging/discharging efficiency than the cell of the Experimental Example 18.

TABLE 3

| | baking temperature (°C.) | baking time (h) | positive electrode density (g/ml) | positive electrode outer diam. (mm) | internal cell resistance (Ω) | charging capacity (mAh) | discharging capacity (mAh) | charging/ discharging eff. (%) |
|---|---|---|---|---|---|---|---|---|
| Exp. ex. 8 | 750 | 3 | impossible | 15.0 | impossible | impossible | impossible | impossible |
| Exp. ex. 9 | 700 | 3 | 3.45 | 15.0 | 10 | 60 | 48 | 85 |
| Exp. ex. 10 | 660 | 3 | 3.40 | 15.2 | 12 | 59 | 47 | 80 |
| Exp. ex. 11 | 600 | 3 | 3.35 | 15.3 | 12 | 58 | 46 | 80 |
| Exp. ex. 12 | 550 | 5 | 3.30 | 15.3 | 14 | 57 | 43 | 75 |
| Exp. ex. 13 | 500 | 5 | 3.25 | 15.3 | 15 | 56 | 42 | 75 |
| Exp. ex. 14 | 400 | 5 | 3.20 | 15.4 | 17 | 55 | 41 | 75 |
| Exp. ex. 15 | 350 | 5 | 3.10 | 15.5 | 17 | 52 | 36 | 70 |
| Exp. ex. 16 | 300 | 5 | 3.00 | 15.5 | 25 | 52 | 24 | 46 |
| Exp. ex. 17 | none | none | 3.5 | 15.5 | 20 | 55 | 27.5 | 50 |
| Exp. ex. 18 | 700 | 3 | 3.45 | 15.0 | 20 | 55 | 35 | 63 |

While the compression-molded products of LiCoO2 were caused to hold the current collectors and baked in the Experimental Examples 8 to 16, the outside diameter and the volumetric density of LiCoO2 were not changed before and after the baking with the Experimental Example 16 with the baking temperature of 300° C. It may be inferred that the Thus it is seen that, if the current collector is held by the LiCoO2 sintered product, the charging/discharging efficiency of the cell may be improved more significantly.

Although the foregoing description has been made of application of the present invention to a coin-shaped cell, similar effects may be achieved when the present invention is applied to a square-shaped cell, as evidenced by our experiments.

It is seen from above that, with the non-aqueous electrolyte secondary cell according to the present invention, in which the positive electrode is composed of a sintered mass of the lithium compound oxide sintered product, the electrical conductivity, charging density of the active material and the reaction area at the positive electrode may be increased, while a high charging/discharging efficiency and high energy density may also be achieved, thus promoting promulgation of portable equipment employing secondary cells.

What is claimed is:

1. A non-aqueous electrolyte secondary cell comprising:
   a positive electrode comprising a compression molded and heat-treated mass of a lithium transition metal compound oxide selected from $LiMn_2O_4$ and compound oxides of the formula $Li_xMO_2$, wherein M is at least one transition metal selected from Co, Ni and Fe and x has a value such that $0.05 \leq x \leq 1.10$, said mass having a volumetric density of from 2.0 to 4.3 g/ml, and said positive electrode being free of any added electrically conductive agent;
   a negative electrode selected from carbonaceous, lithium metal and lithium alloy materials; and
   a non-aqueous electrolyte.

2. A non-aqueous electrolyte secondary cell as defined in claim 1, having an internal resistance of less than or equal to about 17Ω.

3. A non-aqueous electrolyte secondary cell as defined in claim 1, wherein said positive electrode includes a current collector press-fitted to said mass.

4. A non-aqueous electrolyte secondary cell comprising:
   a positive electrode comprising a pellet of a lithium transition metal compound oxide having the formula $Li_xMO_2$, wherein M is selected from at least one of Co, Ni and Fe and x has a value such that $0.05 \leq x \leq 1.10$, said pellet being free of any added electrically conductive agent and being prepared by forming an admixture of powder starting materials selected from carbonates, hydroxides, oxides, alkoxides and organic acid salts of lithium, cobalt and nickel in relative mixing ratios in agreement with the elementary composition of the lithium transition metal compound oxide of the formula, compression molding the admixture under elevated pressure conditions to form a pellet and heating the compression molded pellet in an oxygen-containing atmosphere under elevated temperature conditions for a time sufficient to provide a pellet having a volumetric density of from 2.0 to 4.3 g/ml;
   a negative electrode selected from carbonaceous, lithium metal and lithium alloy materials; and
   a non-aqueous electrolyte.

5. A non-aqueous electrolyte secondary cell as defined in claim 4, wherein the admixture is compression molded at elevated pressures of from about 1 to about 5 tons and heated at elevated temperatures of from about 350° to 1000° C. for a period of about 3 or more hours.

6. A non-aqueous electrolyte secondary cell comprising:
   a positive electrode comprising a current collector having a pellet thereon of a lithium transition metal compound oxide having the formula $Li_xMO_2$, wherein M is selected from at least one of Co, Ni, Fe and x has a value such that $0.05 \leq x \leq 1.10$, said pellet being free of any added electrically conductive agent and being prepared by forming an admixture of powder starting materials selected from carbonates, hydroxides and oxides of lithium, cobalt and nickel in relative mixing ratios in agreement with the elementary composition of the lithium transition metal compound oxide of the formula, heating the admixture in an oxygen-containing atmosphere at a temperature of from about 350° to 1000° C. for a time period sufficient to form a lithium transition metal compound oxide; milling the lithium transition metal compound oxide to form a finely divided compound oxide powder; admixing the compound oxide powder with a minor quantity of binder; compression molding the mixture to form a pellet press fitted to the current collector to form an electrode assembly; and heating the electrode assembly at a temperature of between about 500° to 1000° C. in an inert gas atmosphere to provide a positive electrode having a volumetric density of from 2.0 to 4.3 g/ml.

* * * * *